Sept. 6, 1955 W. R. GIESKE 2,717,039
DETECTOR DEVICE FOR EXPLORING FERROMAGNETIC
STRUCTURE IN WELL BORES
Filed Sept. 2, 1952 3 Sheets-Sheet 3

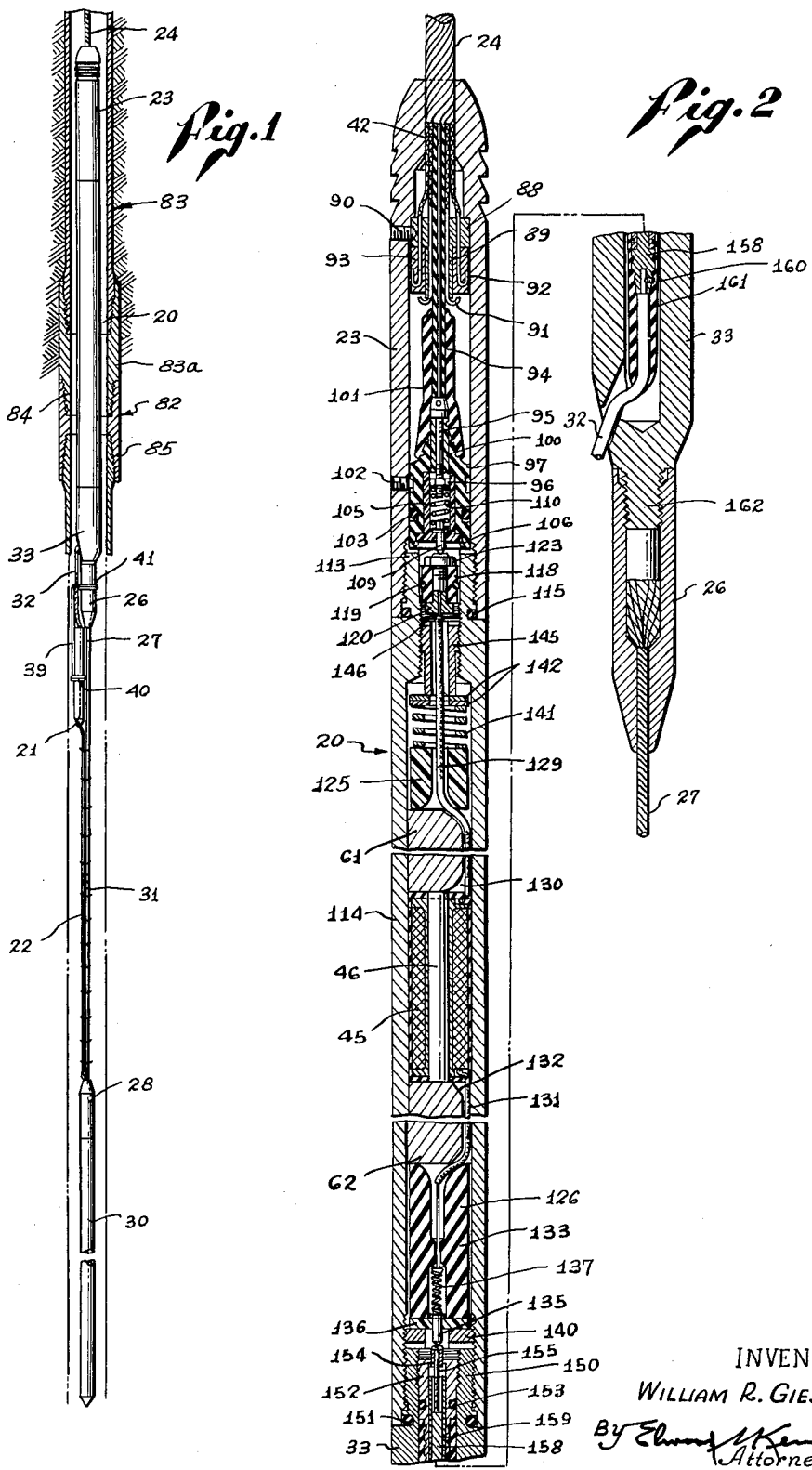
Sept. 6, 1955     W. R. GIESKE     2,717,039
DETECTOR DEVICE FOR EXPLORING FERROMAGNETIC
STRUCTURE IN WELL BORES
Filed Sept. 2, 1952     3 Sheets-Sheet 1
INVENTOR
WILLIAM R. GIESKE

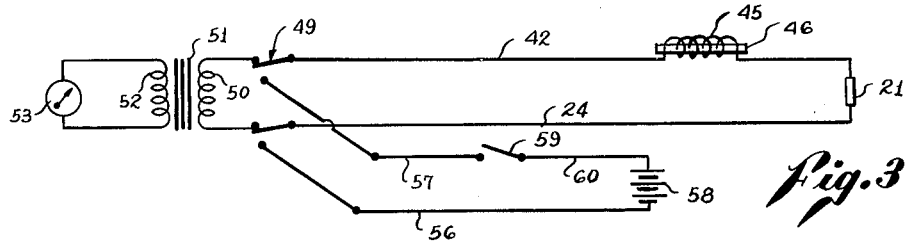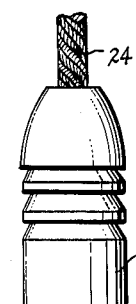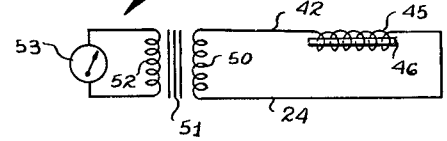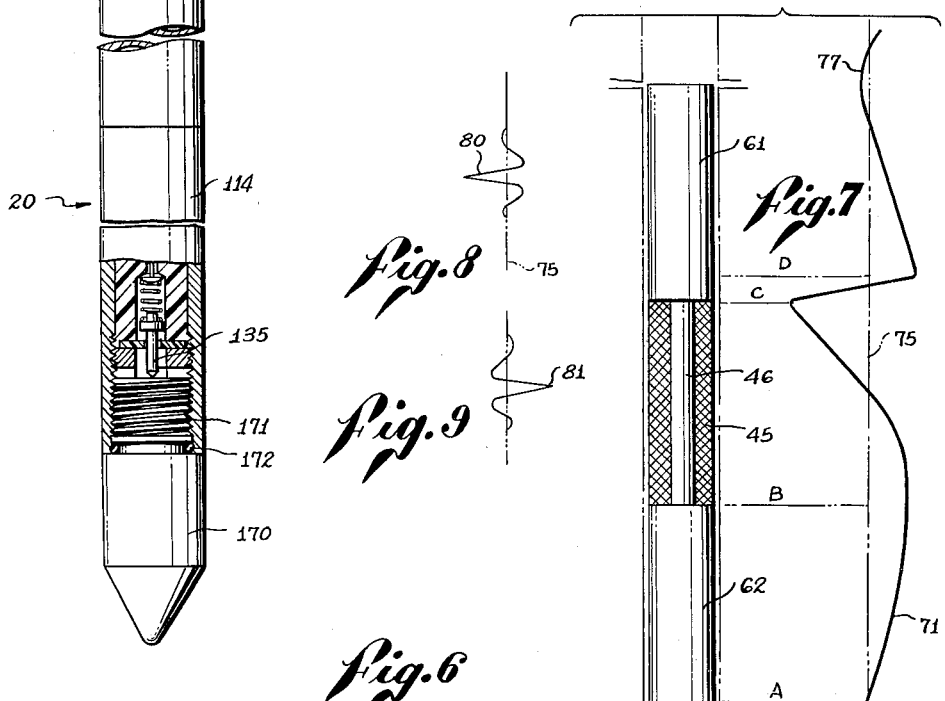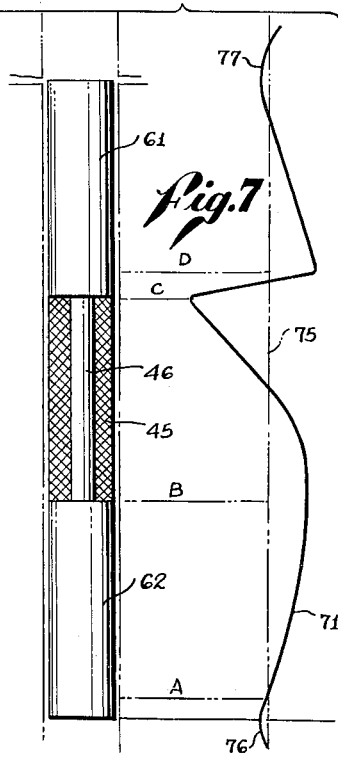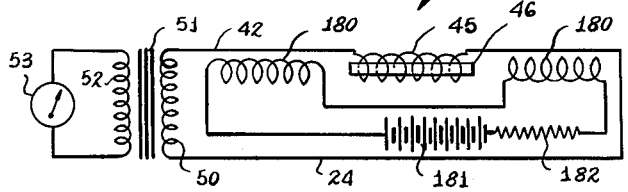

INVENTOR.
WILLIAM R. GIESKE
BY
Attorney

United States Patent Office 2,717,039
Patented Sept. 6, 1955

2,717,039

DETECTOR DEVICE FOR EXPLORING FERROMAGNETIC STRUCTURE IN WELL BORES

William R. Gieske, Fullerton, Calif., assignor to The Ford Alexander Corporation, Whittier, Calif., a corporation of California Application September 2, 1952, Serial No. 307,492

2 Claims. (Cl. 166—65)

This invention relates to methods and devices for ascertaining data about metal structure in an oil well bore or the like and is particularly directed to such devices and methods involving the use of magnetic flux for locating and identifying changes in the configuration of ferromagnetic material along the length of an oil well bore. The invention is directed to such problems as: the problem of ascertaining the location of tools and other metal objects in a well bore; the problem of detecting ends, joints, breaks and other changes in configuration in casing, tubing and drill pipe; and the problem of distinguishing among various types of joints and connectors in casing, tubing and drill pipe.

It is an object of the invention to provide a detector for this purpose that has an exceptionally high degree of sensitivity so that it will respond separatedly to closely spaced configuration changes and, moreover, will distinguish among various kinds of changes in configuration. With such a degree of sensitivity various types of joints and connectors may be readily distinguished from each other to afford exceptionally full information about the metal structure in an oil well. For example, the invention is sufficiently sensitive to detect all three breaks in a normal tool joint and with such sensitivity the detector will readily and reliably identify different types of joints and connectors, pick out the tops or bottoms of collars and locate specific fishing tools in the string.

Because of certain outstanding advantages the invention has been initially embodied in a detector for use in drill pipe or tubing, the detector being of the type commonly known as a collar locator or finder. This presently preferred embodiment of the invention has been selected for description by way of disclosure as well as illustration of the principles involved. Those skilled in the art will find adequate guidance in such a disclosure for applying the underlying principles of the invention to other specific purposes.

One of the important objects of the invention is to provide an exceptionally compact means for achieving the high degree of sensitivity. This object is especially important in the use of the invention in a drill string since the detector must necessarily be of small cross-sectional dimension. It has been found that a detector device of this character may be successful for its purpose in relatively large diameter casing but fail completely when scaled down to a relatively small outside diameter, say a diameter of an inch and one-half, to fit into drill pipe. In general, the problem in this regard is to provide means of relatively small diameter to generate a relatively strong concentration of magnetic flux.

Another object of the preferred form of the invention is to provide an exceptionally simple, rugged and reliable detector for this purpose. A special feature of the invention in this respect is the complete absence of moving parts. A further feature is the elimination of any power source apart from the non-moving parts of the detector itself, the detector being constructed to serve as a power generator when the device is moved longitudinally through ferromagnetic structure of changing configuration along the path of movement.

A special object of the preferred form of the invention is to provide a detector device of this character that may be combined with an explosive charge so that the detector and explosive charge may be lowered as a unit into a well and then the portion of the detector circuit that extends into the well may be used to detonate the explosive. The coupling of a detector and a detonator in the same circuit not only eliminates the necessity of separately running the detector and explosive down the well bore but also precludes any error in the positioning of the explosive relative to a desired point in the well as determined by the detector.

At first thought it would seem to be extremely dangerous to have a detonator included in an actively functioning detector circuit because of the possibility of a signal in the detector circuit causing a premature explosion. If a high amperage E. M. F. source is used for detection there is always the possibility of some kind of failure releasing sufficient electric energy for a premature detonation. In the present invention, however, the safety problem is solved by employing a detector device which generates its own E. M. F. by movement in the well bore and is inherently incapable of generating a signal current of sufficient magnitude to set off the detonator. The detector device generates a signal of sufficient strength for clear indication of the changing structure of the metal walls traversed by the detector but the maximum strength of the detection signal is substantially less than one per cent of the signal strength necessary to detonate the explosive. Thus the detector may be used to generate signals for guidance in positioning an explosive that accompanies the detector and then, after the exploration procedure has been completed, a stronger E. M. F. source at the top of the well may be connected to the portion of the detector circuit that extends into the well to detonate the explosive.

The invention contemplates the attainment of these objects by employing two magnetic fields in the well bore linked with the surrounding metal walls of the bore, the two magnetic fields being oriented longitudinally of the bore with like magnetic poles in end-to-end opposing relation. The two opposed magnetic poles are at sufficiently close spacing longitudinally at the well bore to cause each to buck or distort the other with consequent high concentration of magnetic flux in the region of the bucking boundary between the two fields. It has been found that this concentration of magnetic flux intermediate the two opposed magnetic poles shifts in response to changing configuration of the metal structure traversed by the detecting device and that such shift may be detected by suitably arranging a conductor between the two poles to generate signal current circuit in response to change in the number of flux lines cutting the conductor.

In such a combination the strength of the generated signal current depends on the rate of change in the number of flux lines cutting the conductor. An important feature of the invention in this regard is a certain highly useful acceleration in the shift of the concentrated magnetic flux as the detector moves past a change in the configuration of the surrounding metal walls of the well. As long as the metal wall structure being traversed by the detector is uniform the bucking boundary of the two magnetic fields is in a central neutral position. In passing a change in the configuration of the surrounding ferromagnetic wall, however, the bucking boundary shifts longitudinally to an off-center equilibrium position and at a certain point in the continued movement of the detector, the bucking boundary suddenly shifts with extreme rapidity from the off-center equilibrium position on one side of its neutral position to an opposite off-center equilibrium position on the other side of its normal neutral position. The result of this accelerated rate of change in the number of magnetic lines of force cutting the conductor is a high amplitude current surge or peak in the current flow in the detector circuit.

A further important fact in the utility of the invention is that the direction of the accelerated shift of the concentrated flux or bucking boundary, and therefore the polarity of the resultant flow of signal current, depends upon whether or not the change in configuration of the ferromagnetic wall increases the reluctance of the magnet circuits. Thus a change in configuration of a solid metal wall may increase or decrease the reluctance of the magnetic circuits. A discontinuity in the metal wall at a joint or fracture in the metal wall affords decreased permeability and increases the reluctance of the magnetic circuits. The two kinds of change in configuration of the metal wall may be distinguished by the phase of the signal peak, the signal peak indicative of an enlargement in a solid metal wall being 180° out of phase with respect to a signal indicating a break or joint in the metal wall.

With further reference to the use of a detector of relatively small diameter for exploring drill pipe or tubing as distinguished from a detector of larger diameter for exploring casing, a feature of the preferred practice of the invention is the combination of two permanent magnets in the form of two coaxial cylindrical bars to provide the two bucking magnetic fields. Such an arrangement makes maximum use of the small diameter space available in drill pipe and thereby provides magnetic flux of sufficient density to carry out the detecting function in an effective and thoroughly reliable manner.

The above and other objects and advantages of the invention will be apparent in the following detailed description of preferred form of the invention together with the accompanying drawings.

In the drawings, which are to be regarded as merely illustrative,

Fig. 1 is a side elevation of the invention as used with an accompanying explosive charge, the invention being shown inside a drill pipe;

Fig. 2 is a longitudinal section on an enlarged scale of the detector unit in Fig. 1;

Fig. 3 is a simplified wiring diagram of the electrical system that is used when the detector is combined with an explosive charge;

Fig. 4 is a view partly in side elevation and partly in section showing the detector unit ready for use apart from an explosive charge;

Fig. 5 is a wiring diagram of the electrical system for the detector as used apart from an explosive charge;

Fig. 6 is a wiring diagram similar to Fig. 5 illustrating a modified practice of the invention;

Fig. 7 is a diagram indicating the character of signal that is generated by the movement of the detector past a break or joint in a tubular wall;

Fig. 8 shows how a signal of the same general character may be traced by an oscillograph;

Fig. 9 is similar to Fig. 8 showing a signal of opposite phase;

Figure 10:
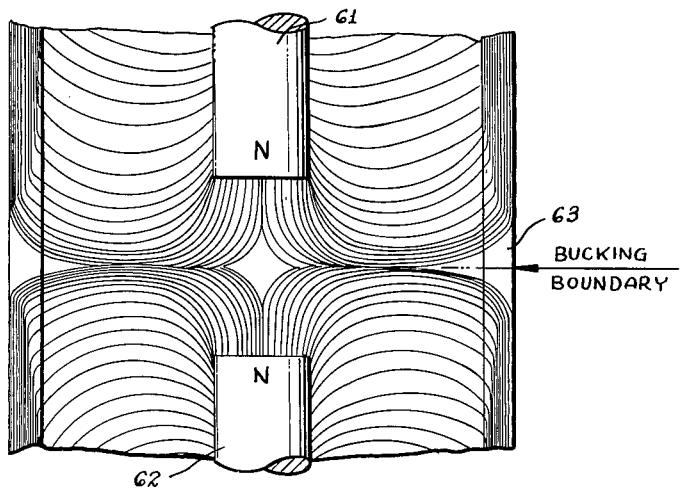
Figure 11:
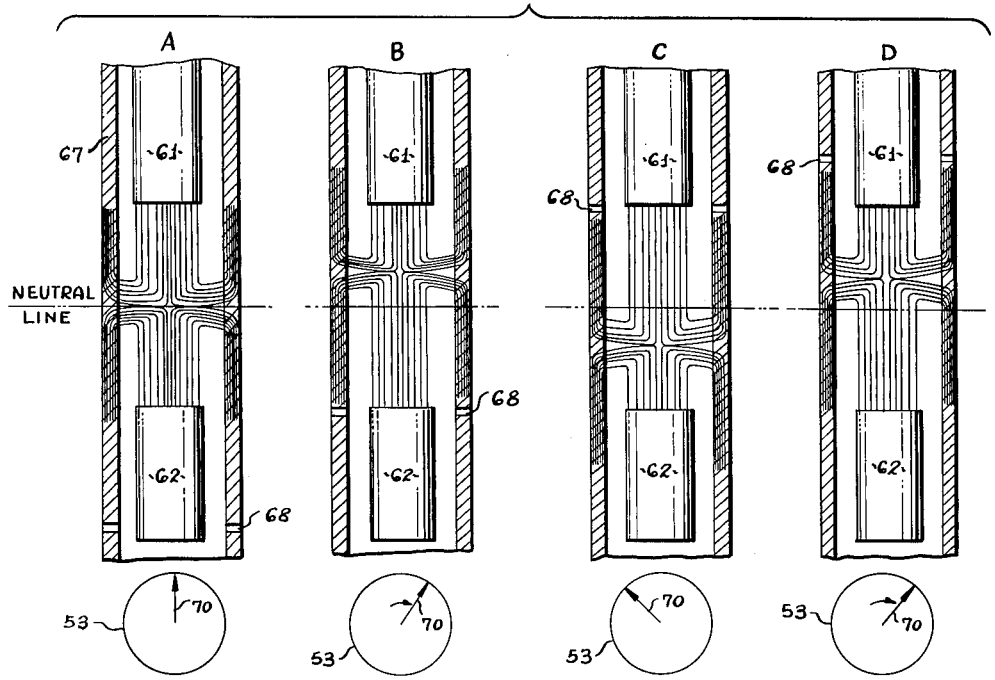

Fig. 10 is a fragmentary diagram on a large scale indicating the general character or pattern of the two bucking magnetic fields; and Fig. 11 is a diagrammatic view showing different stages in the shift of the bucking boundary of the two fields in passing a break in the surrounding metal wall, the figure also showing the resultant behavior of the pointer of an ammeter in response to the signal current.

*General arrangement*

In Fig. 1, illustrating a preferred practice of the invention, a detector unit 20 constructed in accord with the present teachings is combined with a suitable blasting cap or detonator 21 to set off an explosive in the form of a cord 22. At the upper end of the detector unit 20 is a rope socket 23 by means of which the assembly is attached to the end of a supporting cable 24, and at the lower end of the unit is a second rope socket 26 for engagement with the upper end of a flexible by-pass line 27. Connected to the lower end of the by-pass line 27 by a rope socket 28 is a suitable weight or sinker bar 30. Thus the sinker bar by its weight holds the by-pass line 27 taut.

In a typical practice of the invention the by-pass line will be relatively short, say approximately 5 feet long, and the sinker bar will be approximately the same length. The explosive cord 22 is attached to the by-pass line 27 at spaced points by loops of tape 31 and the detonator 21 which is connected to the upper end of the explosive cord is, in turn, connected to the detector unit 20 by a suitable insulated wire conductor 32. The conductor 32 enters the detector unit 20 through a shooting adapter 33.

One side of an electrical circuit for communication with the top of the well is provided by the outer metal of the supporting cable 24 and the other side of the circuit is an insulated conductor in the core of the cable. The detector means inside the detector unit is electrically connected at its upper end to the conductor inside the cable 24 and at its lower end is electrically connected to the insulated wire 32 leading to the detonator 21. To complete this circuit a piece of wire 39 is wound at its lower end on the detonator 21 as indicated at 40 and is wound at its upper end on the rope socket 26 as indicated at 41. Usually protective tape (not shown) is wound around the rope socket 26 and the detonator 21 to form a protective covering for the wire 39.

The electric circuits for the assembly shown in Fig. 1 may be understood by referring to the wiring diagram in Fig. 3. One side of the detector circuit is formed by the cable 24 as previously explained and the other side is formed by a conductor 42 inside the cable. The detector unit includes a pick-up coil or detector coil 45 wound on a soft iron core 46, the detector coil 45 being in series with the detonator 21.

Normally, the detector circuit is connected by a double-pole double-throw switch 49 with the primary coil 50 of a transformer 51, the secondary coil 52 of the transformer being connected to a suitable indicating device such as a microammeter 53. Thus signals generated in the detector coil 45 are transmitted through the detonator 21 to the transformer 51 for indication by the ammeter 53 or other indicating device.

The strength of the signal current generated by the detector coil 45 is exceedingly low being on the order of 5 milliamperes, whereas current flow on the order of magnitude of 1 ampere is required to set off the detonator 21.

For the purpose of firing the explosive in the well the position of the double-pole double-throw switch 49 at the surface of the well is shifted to connect the detector circuit with a firing circuit that includes two leads 56 and 57. Lead 56 is connected to one side of a suitable battery 58, lead 57 is connected to one side of a firing switch 59 and the circuit is completed by a lead 60 interconnecting the battery and firing switch. When the firing circuit is connected in this manner with the detector circuit the detonator 21 may be set off by closing the firing switch 59 to energize the detonator with current, say current on the order of magnitude of 1.2 amperes.

*Principle of detector operation*

As shown diagrammatically in Fig. 7 and shown in structural detail in Fig. 2 the detector means of the detector unit includes, in the preferred practice of the invention, a pair of permanent bar magnets 61 and 62, respectively, between which extends the previously mentioned soft iron core 46 on which the detector coil 45 is wound. The two bar magnets, which are preferably of cylindrical configuration, may be made of the alloy sold under the trade name Alnico and the detector coil 45 may comprise 1650 turns of number 25 insulated copper wire.

The two bar magnets 61 and 62 are positioned with like poles facing each other in mutual opposition and are sufficiently close together to cause the two corresponding magnetic fields to distort or buck each other as shown diagrammatically in Fig. 10. In Fig. 10 showing the two bar magnets 61 and 62 inside a drill pipe 63, it will be noted that the two magnetic fields associated with the two bar magnets are linked with the surrounding drill pipe and that the mutual opposition of the two magnetic fields results in what may be termed a bucking boundary, as shown in Fig. 10, with consequent concentration or high density of the magnetic flux in the region of the bucking boundary. The general behavior of the two bucking magnetic fields may be understood by referring to the series of diagrams in Fig. 11.

In Fig. 11 it is assumed that the two magnets 61 and 62 are being lowered through a steel cylinder 67 which may be taken to represent drill pipe, the steel cylinder having a break or minute gap 68 which may be taken as representing a break in the metal at a tool joint. Since the two magnets 61 and 62 are assumed to be traveling downward through the steel cylinder 67 the steel cylinder may be considered as moving upward relative to the two magnets for the purpose of illustration in Fig. 11. At A in Fig. 11 the steel cylinder 67 is uniform throughout the length of the two magnetic fields, the detector at this time being away from the region of the gap 68 in the steel cylinder. At A in Fig. 11, therefore, the bucking boundary of the two opposed magnetic fields is at the neutral line midway between the two magnets 61 and 62. Since no current is being generated in the detector circuit the pointer 70 of the previously mentioned ammeter 53 is in its vertical or zero position as shown at the bottom of A in Fig. 11.

At B in Fig. 11 the gap 68 in the surrounding steel cylinder 67 has moved into the region of the lower bar magnet 62 and the lower permeability of the gap 68 causes upward distortion of the magnetic field of the lower magnet 62 with consequent upward shift of the bucking boundary. This upward shift of the bucking boundary changes the number of magnetic lines of force linking with the detector coil 45 (not shown in Fig. 11) thereby generating current in one direction in the detector circuit to swing the ammeter pointer clockwise as shown at B in Fig. 11.

As the gap 68 shifts across the space separating the two magnets 61 and 62 from the position of the gap shown at B in Fig. 11 to the position shown at C in Fig. 11, the bucking boundary shifts in a progressive and relatively gradual manner across the neutral line to the lower position shown at C in Fig. 11 and as a consequence the pointer 70 of the ammeter moves progressively counterclockwise from the position shown at B to the position shown at C.

With relatively little additional relative movement of the gap 68 upward, from the position at C to the position at D, the bucking boundary shifts suddenly from the lower position shown at C to the upper position shown at D with a consequent rapid clockwise swing of the pointer 70 of the ammeter to the position shown at the bottom of D. It is readily apparent that a distinctive signal will be generated by this last relatively rapid shift in the concentration of magnetic flux at the bucking boundary from the position below the neutral line to the position above the neutral line.

The behavior of the two bucking magnetic fields and especially the factors that account for the rapidity of the shift of the bucking boundary from the position shown at C to the position shown at D are not wholly understood. It is apparent, however, that there is an overbalance of the two magnetic fields in one direction relative to the neutral line when the gap 68 is in the relative position shown at C and that the overbalance is suddenly reversed with a snap action to the opposite side of the neutral line when the gap 68 shifts to the position shown at D.

If an oscillograph is substituted for the ammeter 53 the stylus of the oscillograph will behave in the general manner indicated by the graph 71 in Fig. 7. The stylus or pen of the oscillograph traces the line 71 with reference to a zero line 75 and in Fig. 7 for the purpose of diagrammatic explanation the signal represented by the graph 71 is attenuated to a length corresponding to the length of the two magnets 61 and 62. Thus the graph 71 is correlated with the movement of the previously mentioned gap 68, the dotted line A in Fig. 7 representing the relative position of the gap 68 shown at A in Fig. 11, and in like manner the dotted lines B, C and D representing the positions of the metal gap at B, C and D, respectively, in Fig. 11.

As continued relative movement brings the metal gap 68 to the lower end of the lower magnet 62 there is a slight waver on the part of the oscillograph pen as indicated at 76 in Fig. 7, and later when the metal gap passes the upper end of the upper magnet 61 there is a second minor waver as indicated at 77. These two minor signals may be ignored. The slope of the graph 71 on one side of the zero line 75 between dotted lines A and B of Fig. 7 is relatively gradual and the return slope to the opposite side of the zero line between dotted lines B and C is also relatively gradual. The reverse slope between dotted lines C and D is also relatively steep and is followed by a final gradual slope back in the zero line.

In an actual oscillograph record the attenuated signal of Fig. 7 would have a configuration of the general character shown in Fig. 8.

It will be noted in Fig. 8 that the wave form has a major sharp peak 80 extending in one direction from the zero line 75. It is to be borne in mind that this wave form is the result of a break in the continuity of the metal wall being explored by the detecting device, which break has the effect of increased reluctance in a magnetic circuit across the break. On the other hand if the metal of the wall increases in thickness without discontinuity of the metal the reluctance of a magnetic circuit including the wall will decrease, and, in general, the resulting wave form on the oscillograph will be reversed from the wave form on Fig. 8. Thus Fig. 9 shows such a wave form having its major peak 81 turned in the opposite direction from the zero line 75.

In this manner the polarity of the major pulse of current generated in the detector coil distinguishes between two kinds of changes of configuration. In practice, moreover, it is also found that the different types of joints and connectors in a drill string create distinctively characteristic wave patterns on the oscillograph that may be readily identified. The detector, for example, will readily respond to all three of the breaks in metal continuity in the tool joint generally designated 82 in drill pipe 83 in Fig. 1. In joint 83a a pin end tool joint 84 is combined with a box end tool joint 85.

*Preferred embodiment of the invention*

Details of the structure of the detector unit 20 in Fig. 1 may be understood by referring to the sectional view in Fig. 2.

The individual wire strands of the sheath of the cable 24 terminate at a cable fitting inside the rope socket 23, which fitting comprises a metal ring 88 with a tubular extension 89 the ring being held in position by a suitable set screw 90. Some of the strands of the cable sheath are hooked around the lower end of the tubular extension 89 as indicated at 91 and the remaining strand ends 92 extend through bores in the metal ring 88 and are embedded in a zinc collar 93 that is cast unitary with the fitting.

The previously mentioned conductor 42 inside the cable 24, which is surrounded by suitable insulation 94 extends through the tubular extension 89 and is terminally connected to the head of a metal conductor screw 95. The conductor screw 95 is secured by means of a nut 96 inside a cylindrical sealing block 97 and is insulated from the block by a surrounding sleeve 100 of non-conducting material. Preferably a protective wrapping 101 of splicing tape encases the insulated conductor 42 as well as the upper end portions of both the metal screw 95 and the cylindrical block 97. The sealing block 97, which is anchored by a suitable set screw 102, is provided with an external O-ring 103. Enclosed by the sealing block 97 is a tubular fitting 105 of non-conducting material that surrounds and insulates the nut 96. The tubular fitting 105, which is held in place by a split ring 106, slidingly carries a headed contact pin 109 that is both yieldably held in place and electrically connected with the conductor screw 95 by means of a suitable helical spring 110.

The main casing of the detector unit is a tubular housing 114 of non-magnetic material, preferably stainless steel. The rope socket 23 is threaded onto the pin end 113 of the housing 114 and the joint is sealed against external fluid pressure by a suitable O-ring 115. The interior of the pin end 113 is sealed by a cylindrical non-conducting body 118 that is embraced by an O-ring 119 and in turn embraces a suitable conductor screw 120. The conductor screw 120, which is positioned to cooperate with the previously mentioned yieldable contact pin 109, is anchored in the non-conducting body 118 by a suitable nut 123 in a fluid-tight manner.

Inside the housing 114 is a longitudinal assembly of parts in end-to-end relation comprising an upper cylindrical body 125 of non-conducting material, the previously mentioned upper bar magnet 61, the previously mentioned soft iron core 46, the previously mentioned lower bar magnet 62, and a lower cylindrical body 126 of non-conducting material.

The length of the housing 114 and the length of the two non-conducting bodies 125 and 126 are sufficient to space the rope sockets 23 and 26 as well as the shooting adapter 33 sufficient distances from the two bar magnets 61 and 62 to avoid undue influence on the flux fields of the magnets. The two rope sockets and the adapter may, therefore, be made of magnetic steel.

An insulated wire 129 extending through the upper cylindrical body 125 and through a longitudinal peripheral groove 130 in the bar magnet 61 electrically connects the conductor screw 120 with the upper end of the detector coil 45 surrounding the soft iron core 46. In like manner, an insulated wire 131 extends from the lower end of the detector coil 45 through a longitudinal peripheral groove 132 in the lower bar magnet 62 to terminate in a metal contact head 133 in the lower cylindrical body 126. A suitable headed contact pin 135 is slidably mounted in a non-conducting disc 136 at the lower end of the cylindrical body 126 and is both yieldingly held in place and electrically connected with the metal contact head 133 by a suitable helical spring 137.

The described longitudinal assembly of parts may be held in place inside the casing 114 in any suitable manner. In the particular construction shown in the drawings, the non-conducting disc 136 at the lower end of the assembly abuts against a metal spacer ring 140 that is threaded into the lower end of the casing 114 and the longitudinal assembly is continually pressed against this spacer ring by a suitable helical spring 141 at the upper end of the assembly. The lower end of the spring 141 presses against the upper cylindrical body 125 and the upper end of the spring presses against a pair of metal washers 142 which washers in turn abut against the lower end of an adjustment bushing 145. The adjustment bushing 145 which has a diametrical slot 146 at its upper end for manipulation by a screwdriver is threaded into the upper end of the casing 114.

The shooting adapter 33 has a pin end 150 that is threaded into the lower end of the casing 114 and is sealed therein by a surrounding O-ring 151. Threaded into the pin end of the shooting adapter 33 is a metal sealing block 152 surrounded by an O-ring 153 and mounted in an insulating sleeve 154 in the sealing block is a conductor screw 155 for cooperation with the previously mentioned headed contact pin 135. The conductor screw 155 is threaded into a conductor fitting 158 that is mounted in the lower end of the sealing block 152 and is insulated therefrom by a suitable non-conducting sleeve 159.

The previously mentioned insulated conductor 32 that extends upward from the detonator or blasting cap 21 is anchored in the conductor fitting 158 by means of a small set screw 160. Preferably the joint between the conductor 32 and the conductor fitting 158 is encased by a wrapping 161 of splicing tape. The lower end of the shooting adapter 33 is a threaded pin 162 onto which the lower rope socket 26 is screwed for support of the bypass line 27 as heretofore described.

Fig. 4 shows the detector unit 20 as adapted for use alone and apart from an explosive charge. For such use, the previously mentioned shooting adapter 33 and the lower rope socket 26 are removed from the lower end of the detector casing 114 and are replaced by a solid metal nose block 170. The nose block 170 has a pin end 171 and is surrounded by an O-ring 172. As shown in Fig. 4 the yieldingly mounted contact pin 135 abuts the pin end of the nose block 170 to connect the contact pin electrically with the detector casing 114 and thereby complete the detector circuit shown in Fig. 5. Fig. 5 is like the previously described Fig. 3 with the switch 49 and the firing circuit omitted.

Fig. 6 shows diagrammatically how a pair of coils 180 energized by a suitable battery 181 in series with a resistor 182 may serve as electromagnets to replace the previously described bar magnets for creation of the two bucking fields. The remainder of the arrangement shown in Fig. 6 is identical with Fig. 5 with corresponding numerals showing corresponding parts.

It will be apparent to those skilled in the art that the described invention is not limited to my specific description and it will be understood that various changes, substitutions and other departures may be made from the present disclosure within the scope and spirit of the appended claims.

I claim:

1. In a device of the character described for lowering into a well through a drilling string that includes fishing tools or the like for the purpose of detecting changes in configuration of ferromagnetic structure along the length of the well bore, the combination of: a cylindrical tubular housing; a core member of soft ferromagnetic material positioned in said housing coaxially thereof, said core member having a diameter of less than half the inside diameter of the tubular housing; a detector coil wound on said core to substantially fill the annular space in the housing around the core; a pair of permanent magnets in said housing positioned in end-to-end contact with the opposite ends of said core, said magnets being of substantially the same diameter as said coil whereby said core, coil and two permanent magnets form an assembly substantially completely filling a longitudinal portion of said housing; and a detector circuit including said coil.

2. In a device of the character described for lowering into a well through a drilling string that includes fishing tools or the like for the purpose of detecting changes in configuration of ferromagnetic structure along the length of the well bore, the combination of: a cylindrical tubular housing of an outside diameter of the order of magnitude of one and one-half inches; a core member of soft ferromagnetic material positioned in said housing coaxially thereof, said core member having a diameter of the order of magnitude of one-third of the inside diameter of the tubular housing; a detector coil wound on said core to substantially fill the annular space in the housing around the core; a pair of permanent magnets in said housing positioned in end-to-end contact with the opposite ends of said core, said magnets being of substantially the same diameter as said coil whereby said core, coil and two permanent magnets form an assembly substantially completely filling a longitudinal portion of said housing, each of said permanent magnets having a longitudinal recess therein; an explosive charge supported by said housing below said assembly for detonation to loosen pipe joints in the well; a detonator for said explosive charge grounded to said housing below said assembly; a cable to support said housing in the well, said cable having two conductor portions insulated from each other, one of said conductor portions being electrically connected with said housing; a detector circuit including a first conductor extending from said cable through the longitudinal recess of one of said permanent magnets to said detector coil, and a second conductor extending through the longitudinal recess of the other permanent magnet from said detector coil to said detonator; and means including a source of E. M. F. to energize said detector circuit to detonate said explosive charge.

References Cited in the file of this patent

UNITED STATES PATENTS

| Number | Name | Date |
|---|---|---|
| 1,992,100 | Stein | Feb. 19, 1935 |
| 2,228,623 | Ennis | Jan. 14, 1941 |
| 2,558,427 | Fagan | June 26, 1951 |